US012811200B2

(12) United States Patent
Otani et al.

(10) Patent No.: US 12,811,200 B2
(45) Date of Patent: Nov. 24, 2026

(54) SECONDARY BATTERY, ELECTRONIC DEVICE, AND POWER TOOL

(71) Applicant: MURATA MANUFACTURING CO., LTD., Kyoto (JP)

(72) Inventors: Akira Otani, Kyoto (JP); Abhilash Chakraborty, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 885 days.

(21) Appl. No.: 17/874,733

(22) Filed: Jul. 27, 2022

(65) Prior Publication Data

US 2022/0367920 A1 Nov. 17, 2022

Related U.S. Application Data

(63) Continuation of application No. PCT/JP2021/003197, filed on Jan. 29, 2021.

(30) Foreign Application Priority Data

Mar. 4, 2020 (JP) ................................ 2020-036953

(51) Int. Cl.
*H01M 10/0587* (2010.01)
*H01M 4/02* (2006.01)
(Continued)

(52) U.S. Cl.
CPC ......... *H01M 10/0587* (2013.01); *H01M 4/13* (2013.01); *H01M 4/64* (2013.01);
(Continued)

(58) Field of Classification Search
CPC ........................ H01M 10/0587; H01M 50/531
See application file for complete search history.

(56) References Cited

U.S. PATENT DOCUMENTS

2004/0237290 A1* 12/2004 Ura .................... H01M 50/533 29/623.1
2005/0142436 A1* 6/2005 Arai ...................... H01G 11/22 429/211
(Continued)

FOREIGN PATENT DOCUMENTS

CN 205319258 U 6/2016
JP 2000294222 A 10/2000
(Continued)

OTHER PUBLICATIONS

International Search Report of corresponding PCT application PCT/JP2021/003197, dated Apr. 6, 2021.
(Continued)

*Primary Examiner* — Nicholas A Smith
*Assistant Examiner* — Benjamin Eli Kass-Mullet
(74) *Attorney, Agent, or Firm* — K&L Gates LLP

(57) ABSTRACT

Disclosed is a secondary battery in which a positive electrode active material non-covered portion is joined to a positive electrode current collector plate at one end portion of an electrode winding body, a negative electrode active material non-covered portion is joined to a negative electrode current collector plate at the other end portion of the electrode winding body, the electrode winding body has a flat surface formed by bending any one or both of the positive electrode active material non-covered portion and the negative electrode active material non-covered portion toward central axis of wound structure and overlapping the positive electrode active material non-covered portion and the negative electrode active material non-covered portion, and a groove formed in the flat surface, the positive electrode has a positive electrode cut-out portion at one end in a transverse direction of the positive electrode on a winding start side of the electrode winding body.

11 Claims, 14 Drawing Sheets

(51) Int. Cl.

| | |
|---|---|
| ***H01M 4/13*** | (2010.01) |
| ***H01M 4/64*** | (2006.01) |
| ***H01M 10/0525*** | (2010.01) |
| ***H01M 50/531*** | (2021.01) |

(52) U.S. Cl.

CPC ..... *H01M 10/0525* (2013.01); *H01M 50/531* (2021.01); *H01M 2004/021* (2013.01); *H01M 2004/027* (2013.01); *H01M 2004/028* (2013.01); *H01M 2220/20* (2013.01); *H01M 2220/30* (2013.01)

(56) References Cited

U.S. PATENT DOCUMENTS

| | | | | |
|---|---|---|---|---|
| 2005/0287432 | A1* | 12/2005 | Cheon | H01M 10/0431 429/211 |
| 2007/0196730 | A1 | 8/2007 | Kozuki | |
| 2010/0304199 | A1* | 12/2010 | Kozuki | H01M 10/286 429/246 |
| 2012/0100406 | A1* | 4/2012 | Gaugler | H01M 10/0427 29/623.2 |
| 2015/0221919 | A1* | 8/2015 | Ueki | H01M 10/0431 429/94 |
| 2018/0131009 | A1* | 5/2018 | Suehiro | H01M 50/186 |
| 2020/0395596 | A1* | 12/2020 | Tokuda | H01M 10/0431 |
| 2021/0344033 | A1* | 11/2021 | Park | H01M 50/152 |
| 2022/0344724 | A1* | 10/2022 | Takahashi | H01M 10/0431 |
| 2024/0304803 | A1* | 9/2024 | Esaki | C01G 53/50 |

FOREIGN PATENT DOCUMENTS

| | | | |
|---|---|---|---|
| JP | 2004095487 | A | 3/2004 |
| JP | 2005209638 | A | 8/2005 |
| JP | 2007227137 | A | 9/2007 |
| JP | 2012038545 | A | 2/2012 |

OTHER PUBLICATIONS

Office Action issued for corresponding Chinese Patent Application No. 202180013387.2, dated Oct. 31, 2025. (4 pages.).

Search Report issued for corresponding Chinese Patent Application No. 202180013387.2, dated Oct. 30, 2025. (3 pages.).

* cited by examiner

A

B

A

B

A

B

A

B

SECONDARY BATTERY, ELECTRONIC DEVICE, AND POWER TOOL

CROSS REFERENCE TO RELATED APPLICATIONS

The present application is a continuation of PCT application no. PCT/JP2021/003197, filed Jan. 29, 2021, which claims priority to Japanese patent application no. JP2020-036953, filed Mar. 4, 2020, the entire contents of which are being incorporated herein by reference.

BACKGROUND

The present application relates to a secondary battery, an electronic device, and a power tool.

Lithium ion batteries have been developed for applications requiring high output such as power tools and automobiles. Examples of one method for achieving high output include high rate discharge in which a relatively large current flows from a battery. A battery for high rate discharge has a structure in which an active material non-covered portion on an end surface of an electrode winding body is bent and a current collector plate is welded.

For example, a technique is described in which an active material non-covered portion is produced at a part of a strip-shaped positive electrode or negative electrode, the active material non-covered portion is bent by pressing to form an end portion into a flat surface, and a current collector plate is welded.

SUMMARY

The present application relates to a secondary battery, an electronic device, and a power tool.

In the technique described above in BACKGROUND section, since the active material non-covered portion is densely disposed at an inner peripheral portion of the electrode winding body, there is a problem that stress is increased by pressing, the positive electrode or the negative electrode at the inner peripheral portion of the electrode winding body is deformed, an active material is peeled off, and an internal short circuit may occur.

Therefore, the present application relates to providing a battery that does not cause an internal short circuit according to an embodiment.

In order to solve the above-described problems, the present application provides a secondary battery, in an embodiment, in which an electrode winding body having a structure in which a strip-shaped positive electrode and a strip-shaped negative electrode are stacked with a separator interposed therebetween and wound, a positive electrode collector plate, and a negative electrode collector plate are housed in a battery can, the positive electrode having a positive electrode active material covered portion covered with a positive electrode active material and a positive electrode active material non-covered portion on a strip-shaped positive electrode foil, the negative electrode having a negative electrode active material covered portion covered with a negative electrode active material and a negative electrode active material non-covered portion on a strip-shaped negative electrode foil, the positive electrode active material non-covered portion being joined to a positive electrode current collector plate at one end portion of the electrode winding body, the negative electrode active material non-covered portion being joined to the negative electrode current collector plate at the other end portion of the electrode winding body, the electrode winding body having a flat surface formed by bending any one or both of the positive electrode active material non-covered portion and the negative electrode active material non-covered portion toward a central axis of the wound structure and overlapping the positive electrode active material non-covered portion and the negative electrode active material non-covered portion, and a groove formed in the flat surface, the positive electrode having a positive electrode cut-out portion at one end in a transverse direction of the positive electrode on a winding start side of the electrode winding body, the negative electrode having a negative electrode cut-out portion at one end in the transverse direction of the negative electrode on the winding start side of the electrode winding body, and an end of the positive electrode cut-out portion being present at the positive electrode active material non-covered portion, and an end of the negative electrode cut-out portion being present at the negative electrode active material non-covered portion.

According to an embodiment, it is possible to provide a battery that can be discharged at a high output without causing an internal short circuit. The contents of the present application should not be interpreted as being limited by the effects exemplified herein.

DETAILED DESCRIPTION

Hereinafter, the present application will be described in further detail including with reference to the drawings according to an embodiment.

The present application described hereinafter includes specific examples, without limitation, according to an embodiment.

In an embodiment, a cylindrical lithium ion battery will be described as an example of the secondary battery.

Figure 1:
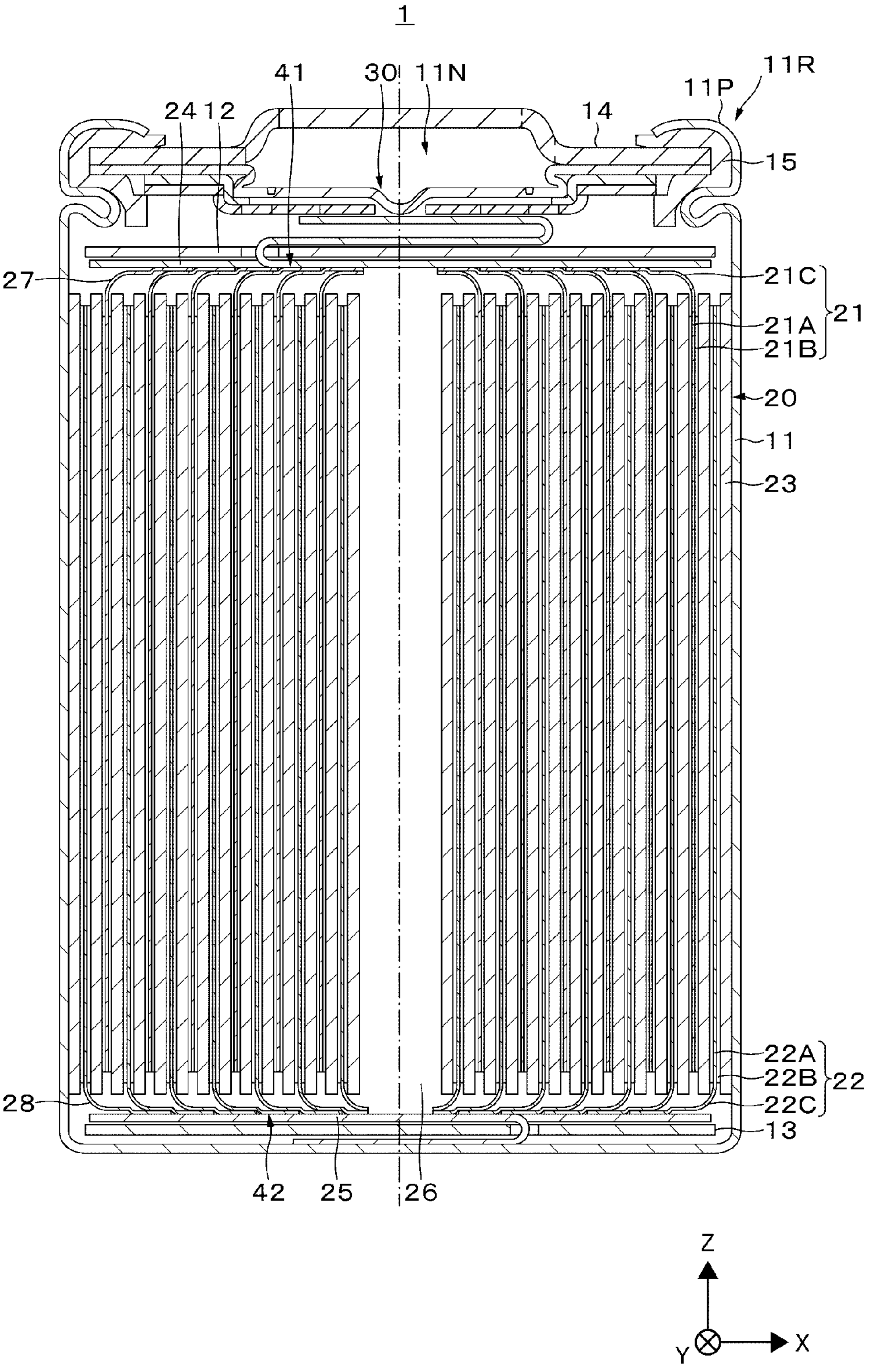
FIG. 1 is a sectional view of a battery according to an embodiment.

First, a whole configuration of the lithium ion battery will be described. FIG. 1 is a schematic sectional view of a lithium ion battery 1. For example, as illustrated in FIG. 1, the lithium ion battery 1 is a cylindrical lithium ion battery containing an electrode winding body 20 inside a battery can 11.

Specifically, the lithium ion battery 1 includes, for example, a pair of insulating plates 12 and 13 and the electrode winding body 20 inside the cylindrical battery can 11. However, the lithium ion battery 1 may further include, for example, one or two or more of a positive temperature coefficient (PTC) element, a reinforcing member, and the like inside the battery can 11.

The battery can 11 is a member that mainly houses the electrode winding body 20. The battery can 11 is, for example, a cylindrical vessel having one end surface opened and the other end surface closed. That is, the battery can 11 has an open end surface (open end surface 11N). The battery can 11 contains, for example, one or two or more of metal materials such as iron, aluminum and their alloys. However, one or two or more of metal materials such as nickel may be plated on the surface of the battery can 11, for example.

The insulating plates 12 and 13 are dish-shaped plates having a surface substantially perpendicular to a winding axis (Z axis in FIG. 1) of the electrode winding body 20. Furthermore, the insulating plates 12 and 13 are arranged to sandwich the electrode winding body 20 between them, for example.

At the open end surface 11N of the battery can 11, the battery lid 14 and the safety valve mechanism 30 are crimped with the gasket 15 interposed therebetween, and a crimped structure 11R (crimped structure) is formed. Consequently, the battery can 11 is hermetically sealed in a state in which the electrode winding body 20 and the like are housed inside the battery can 11.

The battery lid 14 is a member that mainly closes the open end surface 11N of the battery can 11 in the state in which the electrode winding body 20 and the like are housed inside the battery can 11. The battery lid 14 contains, for example, a material similar to a material for forming the battery can 11. A central region of the battery lid 14 protrudes, for example, in a +Z direction. Thus, a region (peripheral region) other than the central region of the battery lid 14 is in contact with, for example, the safety valve mechanism 30.

The gasket 15 is a member that mainly seals a gap between the bent portion 11P and the battery lid 14 by being interposed between the battery can 11 (bent portion 11P) and the battery lid 14. However, a surface of the gasket 15 may be coated with asphalt or the like, for example.

The gasket 15 contains, for example, one or two or more of insulating materials. The type of insulating material is not particularly limited, and is, for example, a polymeric material such as polybutylene terephthalate (PBT) and polypropylene (PP). Particularly, the insulating material is preferably polybutylene terephthalate. This is because the gap between the bent portion 11P and the battery lid 14 is sufficiently sealed while the battery can 11 and the battery lid 14 are electrically separated from each other.

When pressure (internal pressure) inside the battery can 11 rises, the safety valve mechanism 30 mainly releases the internal pressure by releasing the hermetically sealed state of the battery can 11 as necessary. The cause of the increase in the internal pressure of the battery can 11 is, for example, a gas generated due to a decomposition reaction of an electrolytic solution during charge and discharge.

In the cylindrical lithium ion battery, a strip-shaped positive electrode 21 and a strip-shaped negative electrode 22 are spirally wound with the separator 23 interposed therebetween, and are accommodated in the battery can 11 in a state of being impregnated with the electrolytic solution. The positive electrode 21 is obtained by forming a positive electrode active material layer on one surface or both surfaces of a positive electrode foil 21A, and a material of the positive electrode foil 21A is, for example, a metal foil made of aluminum or an aluminum alloy. The negative electrode 22 is obtained by forming a negative electrode active material layer on one surface or both surfaces of a negative electrode foil 22A, and a material of the negative electrode foil 22A is, for example, a metal foil made of nickel, a nickel alloy, copper, or a copper alloy. The separator 23 is a porous and insulating film, and enables movement of substances such as ions and an electrolytic solution while electrically insulating the positive electrode 21 and the negative electrode 22.

Although the positive electrode active material layer and the negative electrode active material layer cover many portions of the positive electrode foil 21A and the negative electrode foil 22A, respectively, neither of the active material layers intentionally covers a periphery of one end in a direction of the strip. Hereinafter, the portions not covered with the active material layer will be appropriately referred to as active material non-covered portions 21C and 22C, and the portions covered with the active material layer will be appropriately referred to as active material covered portions 21B and 22B. In the cylindrical battery, the electrode winding body 20 is wound in such a manner that an active material non-covered portion 21C of the positive electrode and an active material non-covered portion 22C of the negative electrode are overlapped each other with the separator 23 interposed therebetween so as to face in opposite directions.

Figure 2:
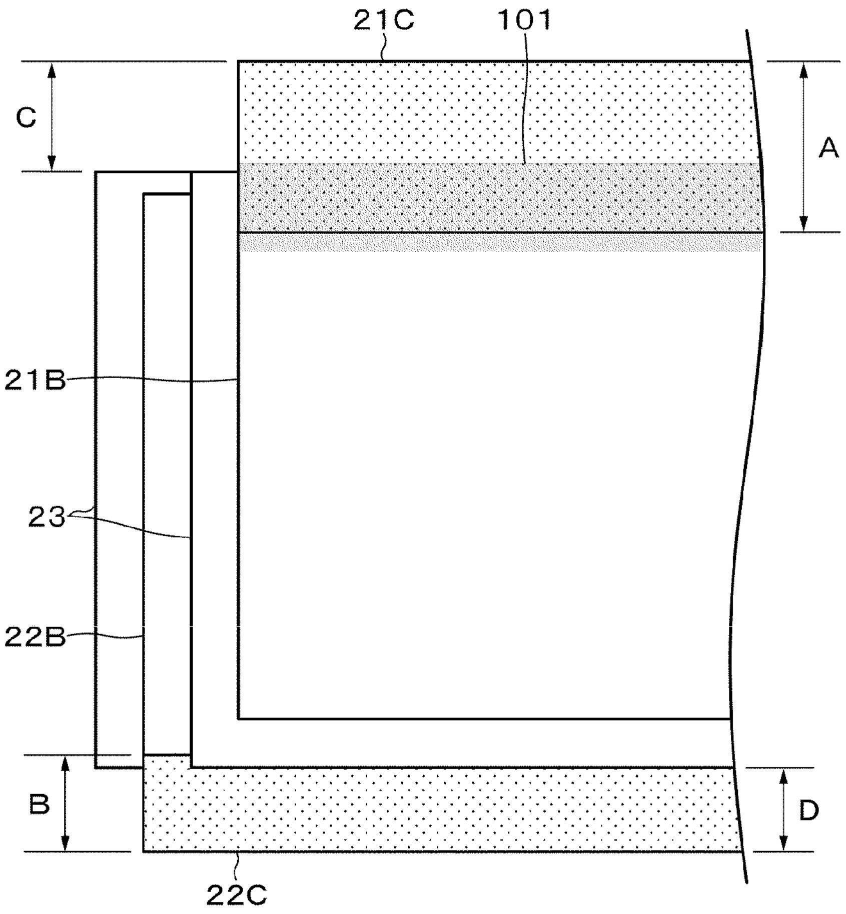
FIG. 2 is a view for explaining an example of an arrangement relationship between a positive electrode, a negative electrode, and a separator in an electrode winding body.

FIG. 2 shows an example of a structure before winding in which the positive electrode 21, the negative electrode 22, and the separator 23 are stacked. A width of the active material non-covered portion 21C (upper dot portion in FIG. 2) of the positive electrode is A, and a width of the active material non-covered portion 22C (lower dot portion in FIG. 2) of the negative electrode is B. In one embodiment, A>B is preferable, for example, A=7 mm and B=4 mm. A length of a portion where the active material non-covered portion 21C of the positive electrode protrudes from one end of the separator 23 in the width direction is C, and a length of a portion where the active material non-covered portion 22C of the negative electrode protrudes from the other end of the separator 23 in the width direction is D. In one embodiment, C>D is preferable, for example, C=4.5 mm and D=3 mm.

The active material non-covered portion 21C of the positive electrode is formed from, for example, aluminum and the like, and the active material non-covered portion 22C of the negative electrode is formed from, for example, copper and the like; therefore, in general, the active material non-covered portion 21C of the positive electrode is softer (has a lower Young's modulus) than the active material non-covered portion 22C of the negative electrode. Thus, in one embodiment, A>B and C>D are more preferable, and in this case, when the active material non-covered portion 21C of the positive electrode and the active material non-covered portion 22C of the negative electrode are simultaneously bent at the same pressure from both electrode sides, a height of the bent portion measured from a tip of the separator 23 may be substantially the same between the positive electrode 21 and the negative electrode 22. At this time, since the active material non-covered portions 21C and 22C are bent and suitably overlap each other, the active material non-covered portions 21C and 22C and current collector plates 24 and 25 can be easily joined by laser welding. Although joining in one embodiment means joining by laser welding, the joining method is not limited to laser welding.

In the positive electrode 21, a section having a width of 3 mm and including a boundary between the active material non-covered portion 21C and the active material covered portion 21B is covered with an insulating layer 101 (gray region portion in FIG. 2). The entire region of the active material non-covered portion 21C of the positive electrode facing the active material covered portion 22B of the negative electrode with the separator interposed therebetween is covered with the insulating layer 101. The insulating layer 101 has an effect of reliably preventing an internal short circuit of the battery 1 when a foreign matter enters between the active material covered portion 22B of the negative electrode and the active material non-covered portion 21C of the positive electrode. In addition, the insulating layer 101 has an effect of absorbing an impact when the impact is applied to the battery 1 and reliably preventing the active material non-covered portion 21C of the positive electrode from being bent or being short-circuited to the negative electrode 22.

A through hole 26 is formed in a central axis of the electrode winding body 20. The through hole 26 is a hole into which a winding core for assembling the electrode winding body 20 and an electrode rod for welding are inserted. Since the electrode winding body 20 is wound in an overlapping manner such that the active material non-covered portion 21C of the positive electrode and the active material non-covered portion 22C of the negative electrode face in opposite directions, the active material non-covered portion 21C of the positive electrode gathers on one end surface (end surface 41) of the electrode winding body, and the active material non-covered portion 22C of the negative electrode gathers on the other end surface (end surface 42) of the electrode winding body 20. In order to improve contact with the current collector plates 24 and 25 for extracting current, the active material non-covered portions 21C and 22C are bent, and the end surfaces 41 and 42 are flat surfaces. The bending direction is a direction from outer edge portions 27 and 28 of the end surfaces 41 and 42 toward the through hole 26, and the active material non-covered portions of adjacent peripheries overlap each other and are bent in a wound state. In the present specification, the "flat surface" includes not only an absolutely flat surface but also a surface having some unevenness and surface roughness to the extent that the active material non-covered portion and the current collector plate can be joined.

When the active material non-covered portions 21C and 22C are bent so as to overlap each other, at first it appears that the end surfaces 41 and 42 can be made flat; however, if no processing is performed before bending, wrinkles or voids (spaces) are generated in the end surfaces 41 and 42 at the time of bending, and the end surfaces 41 and 42 do not become flat surfaces. Here, "wrinkles" and "voids" are portions where unevenness occurs in the bent active material non-covered portions 21C and 22C, and the end surfaces 41 and 42 do not become flat surfaces. In order to prevent the occurrence of wrinkles and voids, a groove 43 (see, for example, FIG. 4B) is formed in advance in a radial direction from the through hole 26. The groove 43 extends from the outer edge portions 27 and 28 of the end surfaces 41 and 42 to the through hole 26. The through hole 26 is provided at the center of the electrode winding body 20, and the through hole 26 is used as a hole into which a welding tool is inserted in an assembly process of the lithium ion battery 1. The active material non-covered portions 21C and 22C at the start of winding of the positive electrode 21 and the negative electrode 22 near the through hole 26 have cut-outs. This is to prevent the through hole 26 from being closed at the time of bending toward the through hole 26. The groove 43 remains in the flat surface after the active material non-covered portions 21C and 22C are bent, and a portion without the groove 43 is joined (welded or the like) to the positive electrode current collector plate 24 or the negative electrode current collector plate 25. Not only the flat surface but also the groove 43 may be joined to a part of the current collector plates 24 and 25.

A detailed configuration of the electrode winding body 20, that is, detailed configurations of the positive electrode 21, the negative electrode 22, the separator 23, and the electrolytic solution will be described later.

In a normal lithium ion battery, for example, a lead for current extraction is welded to each one portion of the positive electrode and the negative electrode; however, this is not suitable for high rate discharge because the internal resistance of the battery is large, and the lithium ion battery generates heat and becomes high temperature during discharge. Thus, in the lithium ion battery of one embodiment, the positive electrode current collector plate 24 and the negative electrode current collector plate 25 are arranged on the end surfaces 41 and 42, and are welded to the active material non-covered portions 21C and 22C of the positive electrode and the negative electrode present on the end surfaces 41 and 42 at multiple points, thereby suppressing the internal resistance of the battery to be low. The end surfaces 41 and 42 being bent to be flat surfaces also contributes to the reduction in resistance.

Figure 3:
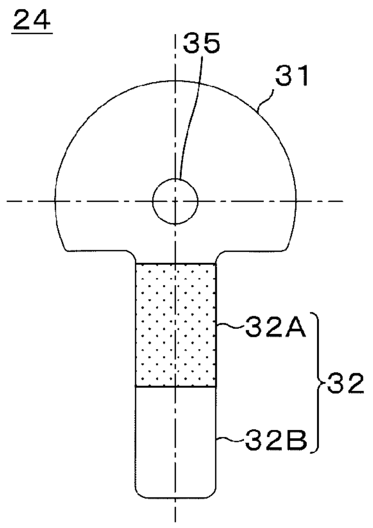
FIG. 3 includes views A and B, where A is a plan view of a positive electrode current collector plate, and where B is a plan view of a negative electrode current collector plate.
Figure 3:
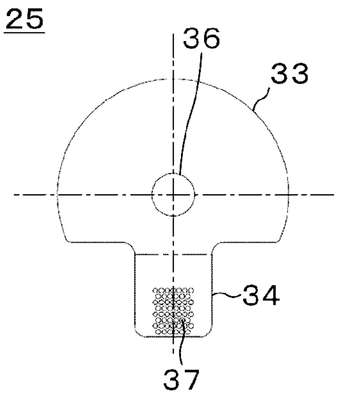

FIGS. 3A and 3B show an example of the current collector plate. FIG. 3A shows the positive electrode current collector plate 24, and FIG. 3B shows the negative electrode current collector plate 25. The material of the positive electrode current collector plate 24 is, for example, a metal plate made of a simple substance or a composite of aluminum or an aluminum alloy, and the material of the negative electrode current collector plate 25 is, for example, a metal plate made of a simple substance or a composite of nickel, a nickel alloy, copper, or a copper alloy. As shown in FIG. 3A, the positive electrode current collector plate 24 has a shape in which a rectangular strip-shaped portion 32 is attached to a plate-shaped portion 31 having a flat fan shape. A hole 35 is formed near the center of the plate-shaped portion 31, and the position of the hole 35 is a position corresponding to the through hole 26.

A portion indicated by dots in FIG. 3A is an insulating portion 32A in which an insulating tape is attached to the strip-shaped portion 32 or an insulating material is applied, and a portion below the dot portion in the drawing is a connecting portion 32B to a sealing plate also serving as an external terminal. In the case of a battery structure in which a metal center pin (not shown) is not provided in the through hole 26, there is a low possibility that the strip-shaped portion 32 comes into contact with a portion having a negative electrode potential, and therefore, the insulating portion 32A may not be provided. In this case, a width between the positive electrode 21 and the negative electrode 22 can be increased by an amount corresponding to a thickness of the insulating portion 32A to increase a charge/discharge capacity.

The negative electrode current collector plate 25 has substantially the same shape as the positive electrode current collector plate 24, but has a different strip-shaped portion. The strip-shaped portion 34 of the negative electrode current collector plate in FIG. 3B is shorter than the strip-shaped portion 32 of the positive electrode current collector plate, and has no portion corresponding to the insulating portion 32A. The strip-shaped portion 34 includes a circular protrusion (projection) 37 indicated by a plurality of circles. During resistance welding, current is concentrated on the protrusion, and the protrusion is melted to weld the strip-shaped portion 34 to a bottom of the battery can 11. Similarly to the positive electrode current collector plate 24, in the negative electrode current collector plate 25, a hole 36 is formed near the center of a plate-shaped portion 33, and the position of the hole 36 is a position corresponding to the through hole 26. The plate-shaped portion 31 of the positive electrode current collector plate 24 and the plate-shaped portion 33 of the negative electrode current collector plate 25 have a fan shape, and thus cover a part of the end surfaces 41 and 42. The reason for not covering the whole is to allow the electrolytic solution to smoothly permeate the electrode winding body when the battery is assembled, or to easily release gas generated when the battery is in an abnormally high temperature state or an overcharged state to the outside of the battery.

The positive electrode active material layer contains at least a positive electrode material (positive electrode active material) capable of occluding and releasing lithium, and may further contain a positive electrode binder, a positive electrode conductive agent, and the like. The positive electrode material is preferably a lithium-containing composite oxide or a lithium-containing phosphate compound. The lithium-containing composite oxide has, for example, a layered rock salt-type or spinel-type crystal structure. The lithium-containing phosphate compound has, for example, an olivine type crystal structure.

The positive electrode binder contains synthetic rubber or a polymer compound. The synthetic rubber includes styrene-butadiene-based rubber, fluororubber, ethylene propylene diene, and the like. The polymer compounds includes polyvinylidene fluoride (PVdF), polyimide, and the like.

The positive electrode conductive agent is a carbon material such as graphite, carbon black, acetylene black, or Ketjen black. However, the positive electrode conductive agent may be a metal material and a conductive polymer.

The thickness of the positive electrode foil 21A is preferably 5 μm or more and 20 μm or less. This is because, if the thickness of the positive electrode foil 21A is 5 μm or more, the positive electrode 21 can be produced without being broken when the positive electrode 21, the negative electrode 22, and the separator 23 are wound in an overlapping manner. This is because, when the thickness of the positive electrode foil 21A is 20 μm or less, a decrease in energy density of the battery 1 can be prevented, and a facing area between the positive electrode 21 and the negative electrode 22 increases, so that the battery 1 having a large output can be obtained.

A surface of the negative electrode foil 22A is preferably roughened for improving close-contact characteristics with the negative electrode active material layer. The negative electrode active material layer contains at least a negative electrode material (negative electrode active material) capable of occluding and releasing lithium, and may further contain a negative electrode binder, a negative electrode conductive agent, and the like.

The negative electrode material contains, for example, a carbon material. The carbon material is easily graphitizable carbon, non-graphitizable carbon, graphite, low crystalline carbon, or amorphous carbon. The shape of the carbon material is fibrous, spherical, granular, or scaly.

The negative electrode material contains, for example, a metal-based material. Examples of the metal-based material include Li (lithium), Si (silicon), Sn (tin), Al (aluminum), Zr (zinc), and Ti (titanium). The metal-based element forms a compound, a mixture, or an alloy with another element, and examples thereof include silicon oxide ($SiO_x$ ($0<x\leq2$)), silicon carbide (SiC), an alloy of carbon and silicon, and lithium titanate (LTO).

The thickness of the negative electrode foil 22A is preferably 5 μm or more and 20 μm or less. This is because, if the thickness of the negative electrode foil 22A is 5 μm or more, the negative electrode 22 can be produced without being broken when the positive electrode 21, the negative electrode 22, and the separator 23 are wound in an overlapping manner. This is because, when the thickness of the negative electrode foil 22A is 20 μm or less, the decrease in energy density of the battery 1 can be prevented, and the facing area between the positive electrode 21 and the negative electrode 22 increases, so that the battery 1 having a large output can be obtained.

The separator 23 is a porous film containing a resin, and may be a stacked film of two or more kinds of porous films. Examples of the resin include polypropylene and polyethylene. The separator 23 may include a resin layer on one side or both sides of a porous membrane as a substrate layer. The reason for this is that, this allows for an improvement in close-contact characteristics of the separator 23 with respect to each of the positive electrode 21 and the negative electrode 22, thereby suppressing distortion of the electrode winding body 20.

The resin layer contains a resin such as PVdF. When the resin layer is formed, the base material layer is coated with a solution prepared by dissolving the resin in an organic solvent, and thereafter, the substrate layer is dried. Alternatively, the base material layer may be immersed in the solution, and thereafter the substrate layer may be dried. The resin layer preferably contains inorganic particles or organic particles from the viewpoint of improving heat resistance and safety of the battery. The type of the inorganic particles is aluminum oxide, aluminum nitride, aluminum hydroxide, magnesium hydroxide, boehmite, talc, silica, mica, or the like. In place of the resin layer, a surface layer formed by a sputtering method, an ALD (atomic layer deposition) method, and other methods and mainly composed of inorganic particles may be used.

The thickness of the separator 23 is preferably 4 μm or more and 30 μm or less. When the thickness of the separator is 4 μm or more, it is possible to prevent an internal short circuit due to contact between the positive electrode 21 and the negative electrode 22 facing each other with the separator 23 interposed therebetween. When the thickness of the separator 23 is 30 μm or less, lithium ions and an electrolytic solution can easily pass through the separator 23, and during winding, an electrode density of the positive electrode 21 and the negative electrode 22 can be increased.

The electrolytic solution contains a solvent and an electrolyte salt, and may further contain an additive and the like as necessary. The solvent is a non-aqueous solvent such as an organic solvent, or water. An electrolytic solution containing a non-aqueous solvent is referred to as a non-aqueous electrolytic solution. The non-aqueous solvent is a cyclic carbonate ester, a chain carbonate ester, lactone, a chain carboxylic ester, or nitrile (mononitrile).

Although a representative example of the electrolyte salt is a lithium salt, a salt other than the lithium salt may be contained. Examples of the lithium salt include lithium hexafluorophosphate ($LiPF_6$), lithium tetrafluoroborate ($LiBF_4$), lithium perchlorate ($LiClO_4$), lithium methanesulfonate ($LiCH_3SO_3$), lithium trifluoromethanesulfonate ($LiCF_3SO_3$), and dilithium hexafluorosilicate ($Li_2SF_6$). These salts may be used in mixture, and among them, it is preferable to use $LiPF_6$ and $LiBF_4$ in mixture from the viewpoint of improving battery characteristics. The content of the electrolyte salt is not particularly limited, and is preferably from 0.3 mol/kg to 3 mol/kg with respect to the solvent.

A method for producing the lithium ion battery 1 of one embodiment will be described with reference to FIGS. 4A to 4F. First, the positive electrode active material was applied and attached to a surface of the strip-shaped positive electrode foil 21A to form a covered portion of the positive electrode 21, and the negative electrode active material was applied to a surface of the strip-shaped negative electrode foil 22A to form a covered portion of the negative electrode 22. At this time, the active material non-covered portions 21C and 22C not applied and attached with the positive electrode active material and the negative electrode active material were produced at one end in a transverse direction of the positive electrode 21 and one end in a transverse direction of the negative electrode 22. A cut-out was formed in a part of the active material non-covered portions 21C and 22C, the part corresponding to the winding start at the time of winding. Steps such as drying were performed on the positive electrode 21 and the negative electrode 22. The active material non-covered portion 21C of the positive electrode and the active material non-covered portion 22C of the negative electrode were overlapped with the separator 23 interposed therebetween so as to be in opposite directions, and wound in a spiral shape so as to form the through hole 26 in the central axis and to dispose the formed cut-out near the central axis, thereby producing the electrode winding body 20 as shown in FIG. 4A.

Figure 4:
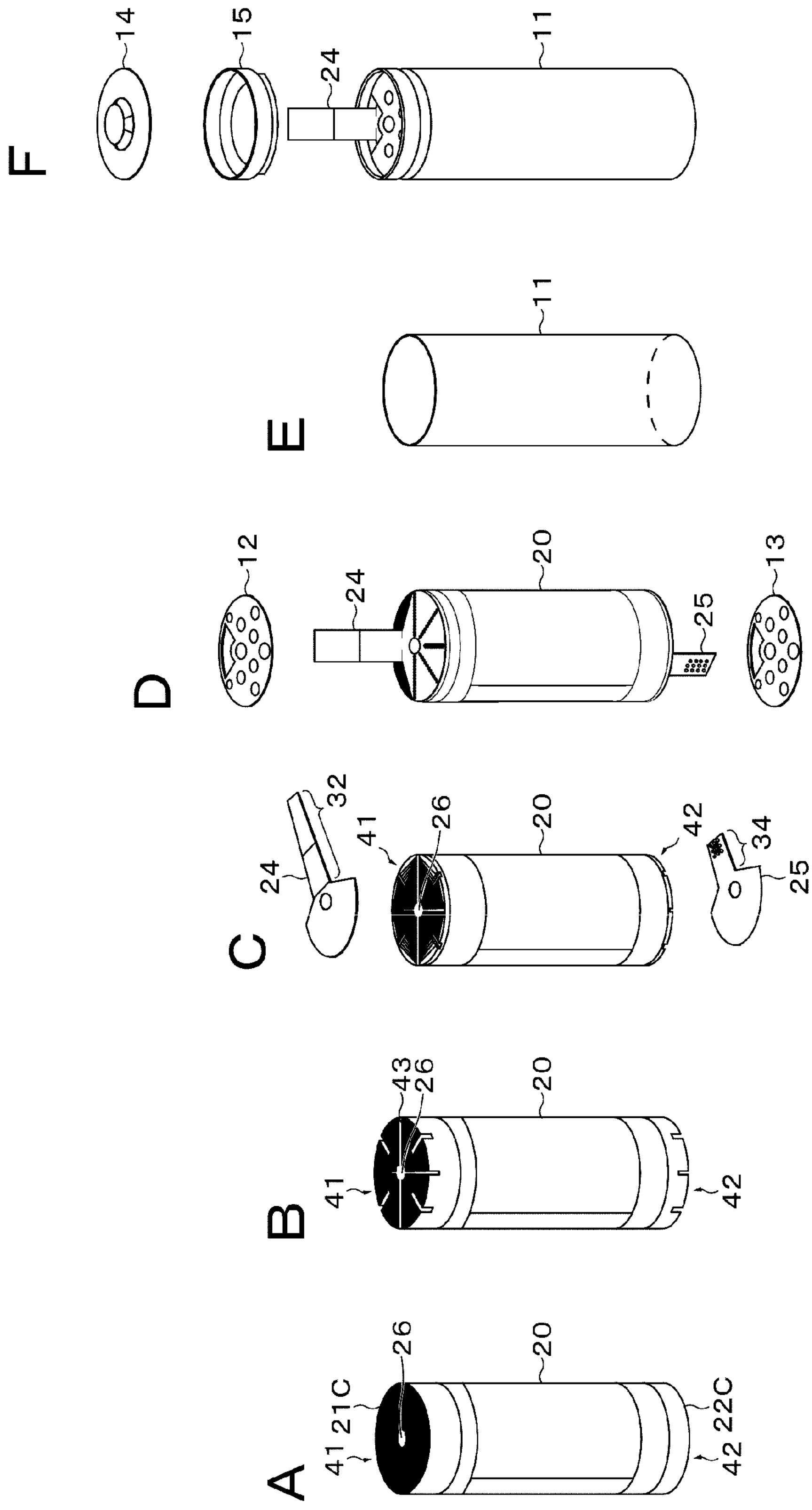
FIG. 4 includes views A to F for explaining an assembly process of the battery according to an embodiment.

Next, as shown in FIG. 4B, by perpendicularly pressing an end of a thin flat plate (for example, a thickness of 0.5 mm) or the like against the end surfaces 41 and 42, the end surfaces 41 and 42 were locally bent to produce the groove 43. In this way, the groove 43 extending radially from the through hole 26 toward the central axis was produced. The number and arrangement of the grooves 43 shown in FIG. 4B are merely examples. As shown in FIG. 4C, the same pressure was simultaneously applied from both electrode sides in a direction substantially perpendicular to the end surfaces 41 and 42, and the active material non-covered portion 21C of the positive electrode and the active material non-covered portion 22C of the negative electrode were bent to form the end surfaces 41 and 42 to be flat surfaces. At this time, a load was applied with a flat plate surface or the like such that the active material non-covered portions on the end surfaces 41 and 42 were bent by overlapping toward the through hole 26 side. Thereafter, the plate-shaped portion 31 of the positive electrode current collector plate 24 was laser-welded to the end surface 41, and the plate-shaped portion 33 of the negative electrode current collector plate 25 was laser-welded to the end surface 42.

Thereafter, as shown in FIG. 4D, the strip-shaped portions 32 and 34 of the current collector plates 24 and 25 were bent, the insulating plates 12 and 13 (or insulating tapes) were attached to the positive electrode current collector plate 24 and the negative electrode current collector plate 25, and the electrode winding body 20 assembled as described above was inserted into the battery can 11 shown in FIG. 4E to weld the bottom of the battery can 11. After the electrolytic solution was injected into the battery can 11, sealing was performed with the gasket 15 and the battery lid 14 as shown in FIG. 4F.

EXAMPLES

Hereinafter, the present application will be described based on Examples in which an open circuit voltage failure rate is compared using the lithium ion battery 1 produced as described above according to an embodiment. The present application is not limited to Examples described below.

In all of the following Examples and Comparative Examples, a battery size was set to 21700, and the separator 23 was overlapped so as to cover the entire range of the active material covered portion 21B of the positive electrode and the active material covered portion 22B of the negative electrode. The number of the grooves 43 was eight.

Figure 5:
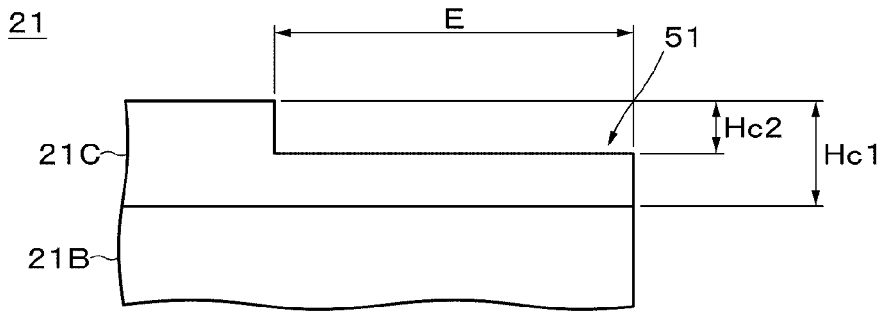
FIG. 5 includes views A and B for explaining a cut-out portion of the positive electrode and a cut-out portion of the negative electrode.
Figure 5:
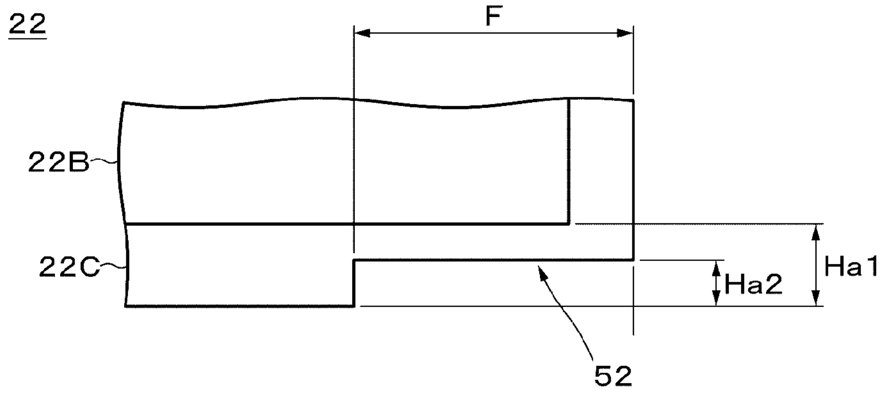

FIG. 5A is an enlarged view (view of a corner on the winding start side) of a portion of the active material non-covered portion 21C of the positive electrode on the winding start side of the electrode winding body 20. The positive electrode has a cut-out portion 51 of the positive electrode at one end in the transverse direction of the positive electrode 21 on the winding start side of the electrode winding body 20. As shown in FIG. 5A, the width of the active material non-covered portion 21C of the positive electrode at one end in the transverse direction of the positive electrode 21 is Hc1, and the width of the cut-out portion 51 of the positive electrode is Hc2. Hc1 is, for example, 7 mm. FIG. 5B is an enlarged view (view of a corner on the winding start side) of a portion of the active material non-covered portion 22C of the negative electrode on the winding start side of the electrode winding body 20. The negative electrode has a cut-out portion 52 of the positive electrode at one end in the transverse direction of the negative electrode 22 on the winding start side of the electrode winding body 20. As shown in FIG. 5B, the width of the active material non-covered portion 22C of the negative electrode at one end in the transverse direction of the negative electrode 22 is Ha1, and the width of the cut-out portion 52 of the negative electrode is Ha2. Ha1 is, for example, 4 mm.

A value E shown in FIG. 5A is a length of the cut-out portion 51 of the positive electrode along the longitudinal direction of the positive electrode 21, and a value F shown in FIG. 5B is a length of the cut-out portion 52 of the negative electrode along the longitudinal direction of the negative electrode 22. In one embodiment, an inner peripheral portion is an innermost periphery of the positive electrode 21 and the negative electrode 22 of the electrode winding body 20 and a portion in the vicinity of the innermost periphery. The values E and F are each preferably a value corresponding to once or more and five times or less the inner peripheral portion of the electrode winding body 20.

Figure 6:
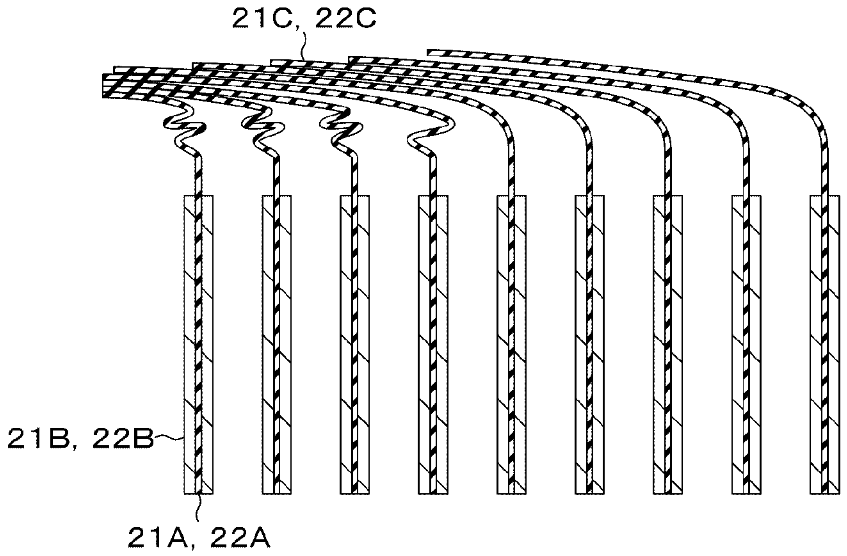
FIG. 6 includes views A and B, where A is a view for explaining Examples 1 to 5, and where B is a view for explaining Comparative Examples 2 and 3.
Figure 6:
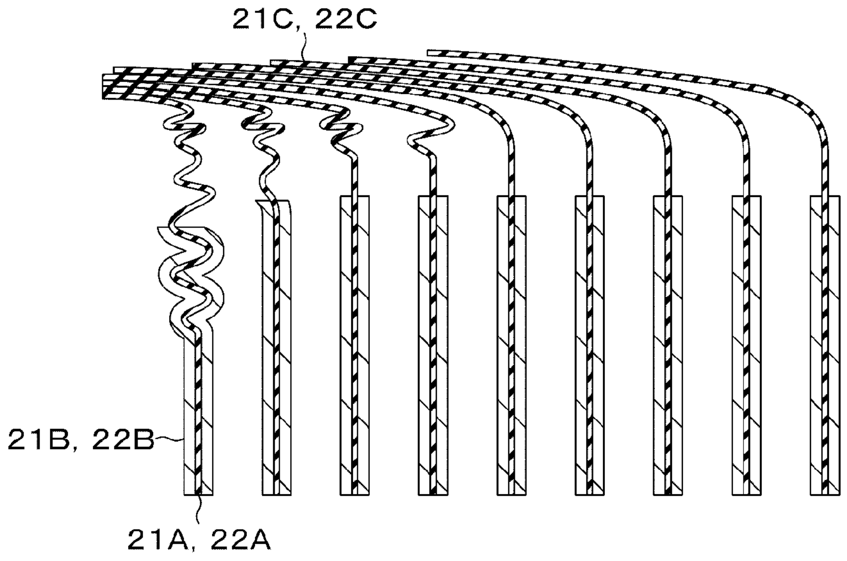

FIGS. 6A and 6B are partial sectional views of the positive electrode 21 or the negative electrode 22 after the active material non-covered portions 21C and 22C are bent (see FIG. 4C), and one of the positive electrode 21 or the negative electrode 22 is displayed. The left side of the drawing is the inner peripheral portion of the electrode winding body 20, and the right side of the drawing is an outer peripheral portion of the electrode winding body 20. When the values E and F are each the value corresponding to once or more the inner peripheral portion of the electrode winding body 20, the active material non-covered portions 21C and 22C can be bent without damaging the positive electrode 21 or the negative electrode 22 as shown in FIG. 6A; however, in the case where the values are less than once, when the active material non-covered portions 21C and 22C are bent as shown in FIG. 6B, the active material covered portion 21B of the positive electrode or the active material covered portion 22B of the negative electrode in the positive electrode 21 or the negative electrode 22 is bent, and the active material is peeled off from the positive electrode 21 or the negative electrode 22, which causes an internal short circuit. When the value E or F is larger than the value corresponding to five times the inner peripheral portion of the electrode winding body 20, the number of portions where the end surfaces 41 and 42 and the current collector plates 24 and 25 can be welded is reduced, and there is a possibility that the internal resistance increases.

FIGS. 7A, 7B, 8A, and 8B are views showing the negative electrode 22 overlapped on the positive electrode 21 before winding, where the right side of the drawing is the winding start side of the electrode winding body 20, and the left side of the drawing is the winding end side of the electrode winding body 20. Hereinafter, the end 53 of the cut-out portion of the positive electrode represents an end along the longitudinal direction of the positive electrode 21 among the ends of the cut-out portion 51 of the positive electrode, and the end 54 of the cut-out portion of the negative electrode represents an end along the longitudinal direction of the negative electrode 22 among the ends of the cut-out portion 52 of the negative electrode.

Example 1

Figure 7:
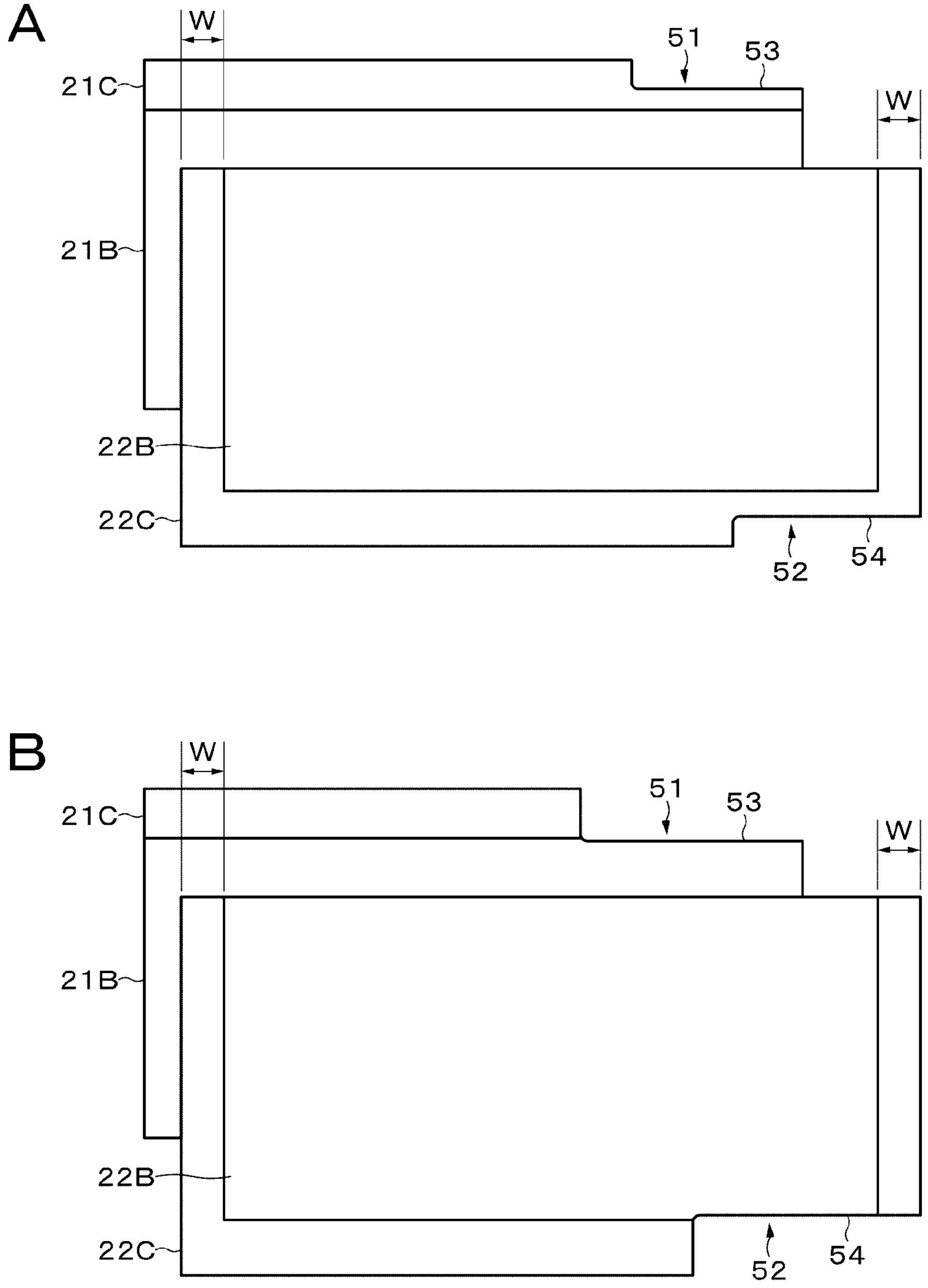
FIG. 7 includes views A and B, where A is a view for explaining Examples 1 to 5, and where B is a view for explaining Comparative Example 1.

As shown in FIG. 7A, a position of the end 53 of the cut-out portion of the positive electrode was the active material non-covered portion 21C of the positive electrode, a position of the end 54 of the cut-out portion of the negative electrode was the active material non-covered portion 22C of the negative electrode, Hc2/Hc1×100=15, Ha2/Ha1×100=15, and the values E and F were values corresponding to once the electrode winding body 20. The active material non-covered portions 22C having a width of 1 mm (W=1 mm) were arranged at both ends (ends on the winding start side and the winding end side) in the longitudinal direction of the negative electrode 22.

Example 2

The conditions were the same as in Example 1 except that Hc2/Hc1×100=20 and Ha2/Ha1×100=20.

Example 3

The conditions were the same as in Example 1 except that Hc2/Hc1×100=30 and Ha2/Ha1×100=30.

Example 4

The conditions were the same as in Example 1 except that Hc2/Hc1×100=90 and Ha2/Ha1×100=90.

Example 5

The conditions were the same as in Example 1 except that Hc2/Hc1×100=95 and Ha2/Ha1×100=95.

Comparative Example 1

The cut-out portions 51 and 52 were not formed at the positive electrode 21 and the negative electrode 22, Hc2/Hc1×100=0, and Ha2/Ha1×100=0. The active material non-covered portions 22C having a width of 1 mm were arranged at both ends (ends on the winding start side and the winding end side) in the longitudinal direction of the negative electrode 22.

Comparative Example 2

As shown in FIG. 7B, the position of the end 53 of the cut-out portion of the positive electrode was the active material covered portion 21B of the positive electrode, the position of the end 54 of the cut-out portion of the negative electrode was the active material covered portion 22B of the negative electrode, Hc2/Hc1×100=100, Ha2/Ha1×100=100, and the values E and F were values corresponding to once the electrode winding body. The active material non-covered portions 22C having a width of 1 mm were arranged at both ends (ends on the winding start side and the winding end side) in the longitudinal direction of the negative electrode 22.

Comparative Example 3

The conditions were the same as in Comparative Example 2 except that Hc2/Hc1×100=110 and Ha2/Ha1×100=110.

The open circuit voltage failure rate was determined for the batteries 1 of Examples 1 to 5 and Comparative Examples 1 to 3. In the open circuit voltage failure rate, when constant current-constant voltage charging was performed at 500 mA at an environmental temperature of 25° C., the voltage value of the battery 1 immediately after reaching 4.2 V (within 1 hour) was V1, the battery 1 was left to stand thereafter, and the voltage value of the battery 1 after two weeks was V2, the battery 1 in which $V1-V2 \geq 50$ mV was determined as an open circuit voltage failure, and the number of the batteries 1 was counted to obtain a ratio with respect to the whole. The number of tests was 100 for each example. The results are shown in Table 1.

TABLE 1

| | Position of end of cut-out portion of positive electrode | Position of end of cut-out portion of negative electrode | Hc2/ Hc1 × 100 | Ha2/ Ha1 × 100 | Presence or absence of active material non-covered portion at both ends in longitudinal direction of negative electrode | Open circuit voltage failure rate (%) |
|---|---|---|---|---|---|---|
| Example 1 | Active material non-covered portion of positive electrode | Active material non-covered portion of negative electrode | 15 | 15 | Presence | 3 |
| Example 2 | Active material non-covered portion of positive electrode | Active material non-covered portion of negative electrode | 20 | 20 | Presence | 1 |
| Example 3 | Active material non-covered portion of positive electrode | Active material non-covered portion of negative electrode | 30 | 30 | Presence | 1 |
| Example 4 | Active material non-covered portion of positive electrode | Active material non-covered portion of negative electrode | 90 | 90 | Presence | 1 |
| Example 5 | Active material non-covered portion of positive electrode | Active material non-covered portion of negative electrode | 95 | 95 | Presence | 2 |
| Comparative Example 1 | — | — | 0 | 0 | Presence | 6 |
| Comparative Example 2 | Active material covered portion of positive electrode | Active material covered portion of negative electrode | 100 | 100 | Presence | 7 |
| Comparative Example 3 | Active material covered portion of positive electrode | Active material covered portion of negative electrode | 110 | 110 | Presence | 7 |

The open circuit voltage failure rates of Examples 1 to 5 were as relatively low as 3% or less, whereas the open circuit voltage failure rates of Comparative Examples 1 to 3 were as relatively high as 6% or more. It is considered that in the electrode winding body 20 of Examples 1 to 5, as shown in FIG. 6A, the active material non-covered portions 21C and 22C can be bent without damaging the positive electrode 21 and the negative electrode 22. In Comparative Example 1, it was considered that the active material non-covered portions 21C and 22C were bent as shown in FIG. 6B, so that the active material covered portion 21B of the positive electrode and the active material covered portion 22B of the negative electrode were bent, the active material was peeled off from the positive electrode 21 and the negative electrode 22, and an internal short circuit occurred. In Comparative Examples 2 and 3, since there were no innermost circumferential active material non-covered portions 21C and 22C which are portions serving as lids of the end surfaces 41 and 42 of the electrode winding body 20, it was considered that a metal powder or the like was mixed into the electrode winding body 20 from the outside, and an internal short circuit occurred.

From Table 1, when the position of the end 53 of the cut-out portion of the positive electrode is in the active material non-covered portion 21C of the positive electrode and the position of the end 54 of the cut-out portion of the negative electrode is in the active material non-covered portion 22C of the negative electrode, or when $15 \leq Hc2/Hc1 \times 100 \leq 95$ and $15 \leq Ha2/Ha1 \times 100 \leq 95$, the battery 1 can be charged and discharged with almost no internal short circuit. By limiting to Examples 2 to 4, the open circuit voltage failure rate was as lower as 1%. From Table 1, when $20 \leq Hc2/Hc1 \times 100 \leq 90$ and $20 \leq Ha2/Ha1 \times 100 \leq 90$, the battery 1 can be charged and discharged without causing an internal short circuit.

Figure 8:
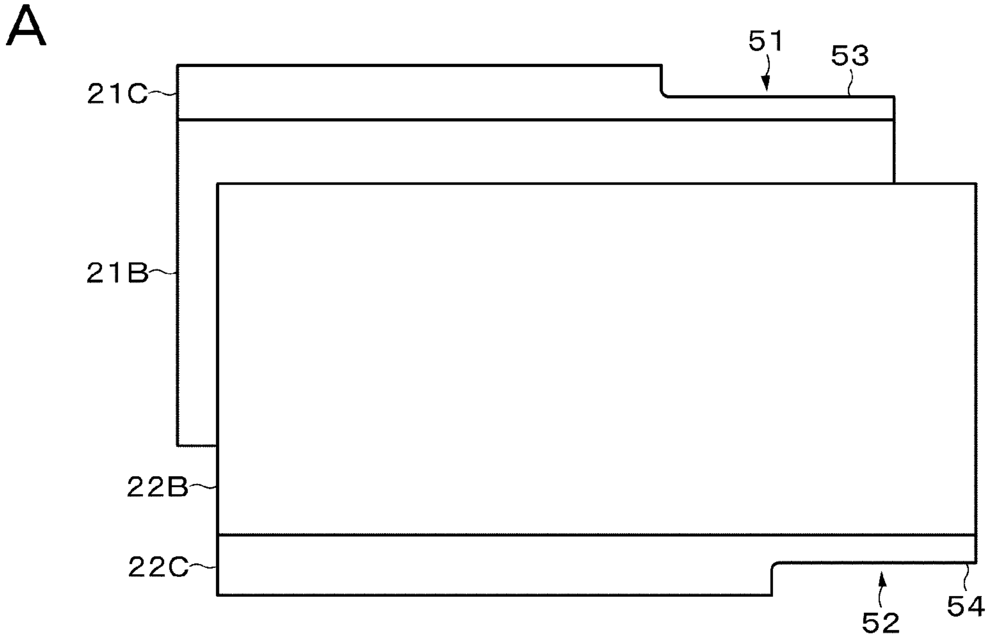
FIG. 8 includes views A and B, where A is a view for explaining Examples 11 to 15, and where B B is a view for explaining Comparative Examples 12 and 13.
Figure 8:
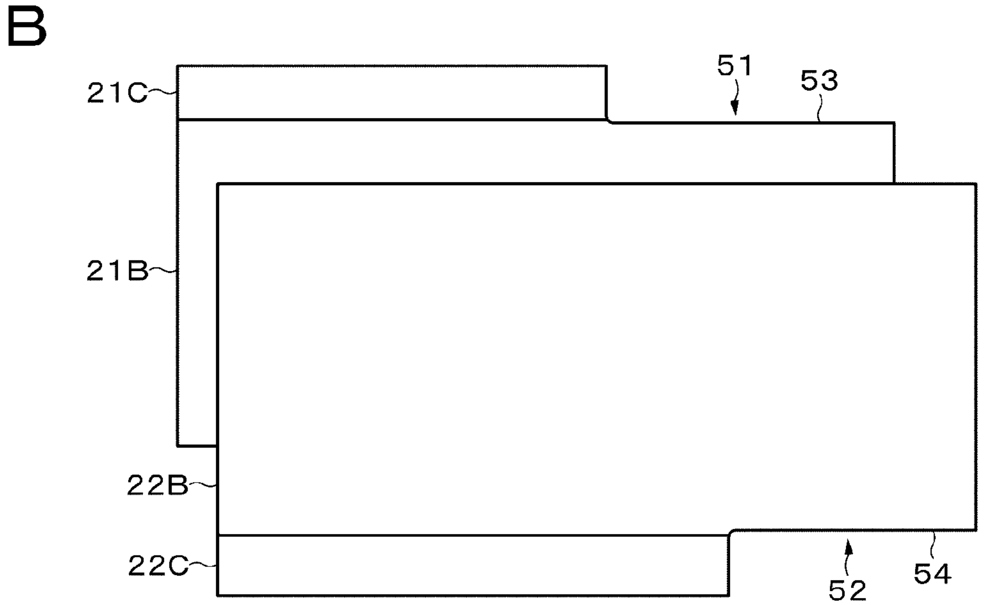

Next, as shown in FIGS. 7A and 7B, a case where the active material non-covered portion 22C having a width of 1 mm (W=1 mm) was not disposed at both ends in the longitudinal direction of the negative electrode 22 was examined. In Examples 11 to 15 and Comparative Example 11, as shown in FIG. 8A, the active material covered portion 22B of the negative electrode and the active material non-covered portion 22C of the negative electrode were arranged so as to be aligned at both ends (ends on the winding start side and the winding end side) in the longitudinal direction of the negative electrode 22. In Comparative Examples 12 and 13, as shown in FIG. 8B, the active material covered portion 22B of the negative electrode and the active material non-covered portion 22C of the negative electrode were arranged so as to be aligned at the end on the winding end side in the longitudinal direction of the negative electrode 22, and the active material covered portion 22B of the negative electrode was disposed at the end on the winding start side.

Example 11

As shown in FIG. 8A, the position of the end 53 of the cut-out portion of the positive electrode was the active material non-covered portion 21C of the positive electrode, the position of the end 54 of the cut-out portion of the negative electrode was the active material non-covered portion 22C of the negative electrode, $Hc2/Hc1 \times 100 = 15$, $Ha2/Ha1 \times 100 = 15$, and the values E and F were values corresponding to once the electrode winding body 20. The active material covered portion 22B of the negative electrode and the active material non-covered portion 22C of the negative electrode were arranged so as to be aligned at both ends (ends on the winding start side and the winding end side) in the longitudinal direction of the negative electrode 22.

Example 12

The conditions were the same as in Example 11 except that $Hc2/Hc1 \times 100 = 20$ and $Ha2/Ha1 \times 100 = 20$.

Example 13

The conditions were the same as in Example 11 except that $Hc2/Hc1 \times 100 = 30$ and $Ha2/Ha1 \times 100 = 30$.

Example 14

The conditions were the same as in Example 11 except that $Hc2/Hc1 \times 100 = 90$ and $Ha2/Ha1 \times 100 = 90$.

Example 15

The conditions were the same as in Example 11 except that Hc2/Hc1×100=95 and Ha2/Ha1×100=95.

Comparative Example 11

The cut-out portions were not formed at the positive electrode 21 and the negative electrode 22, Hc2/Hc1×100=0, and Ha2/Ha1×100=0. The active material covered portion 22B of the negative electrode and the active material non-covered portion 22C of the negative electrode were arranged so as to be aligned at both ends (ends on the winding start side and the winding end side) in the longitudinal direction of the negative electrode 22.

Comparative Example 12

As shown in FIG. 8B, the position of the end 53 of the cut-out portion of the positive electrode was the active material covered portion 21B of the positive electrode, the position of the end 54 of the cut-out portion of the negative electrode was the active material covered portion 22B of the negative electrode, Hc2/Hc1×100=100, Ha2/Ha1×100=100, and the values E and F were values corresponding to once the electrode winding body 20. The active material covered portion 22B of the negative electrode and the active material non-covered portion 22C of the negative electrode were arranged so as to be aligned at the end on the winding end side in the longitudinal direction of the negative electrode 22, and the active material covered portion 22B of the negative electrode was disposed at the end on the winding start side.

Comparative Example 13

The conditions were the same as in Comparative Example 12 except that Hc2/Hc1×100=110 and Ha2/Ha1×100=110.

For the batteries 1 of Examples 11 to 15 and Comparative Examples 11 to 13, the open circuit voltage failure rate was determined as described above. Similarly, the number of tests was 100 for each example. The results are shown in Table 2.

As in Examples 11 to 15 and Comparative Examples 11 to 13, when the active material non-covered portion 22C was not present at both ends in the longitudinal direction of the negative electrode 22, it was found that the same results as those in the case where the active material non-covered portions 22C were present at both ends in the longitudinal direction of the negative electrode 22 (Examples 1 to Example 5 and Comparative Examples 1 to 3) were obtained. From Table 2, when the position of the end 53 of the cut-out portion of the positive electrode is in the active material non-covered portion 21C of the positive electrode and the position of the end 54 of the cut-out portion of the negative electrode is in the active material non-covered portion 22C of the negative electrode, or when 15≤Hc2/Hc1×100≤95 and 15≤Ha2/Ha1×100≤95, the battery 1 can be charged and discharged with almost no internal short circuit. From Table 1, when 20≤Hc2/Hc1×100≤90 and 20≤Ha2/Ha1×100≤90, the battery 1 can be charged and discharged without causing an internal short circuit.

The present application is described herein according to an embodiment; however, the contents of the present application are not limited thereto, and various modifications can be made according to an embodiment.

Figure 9:
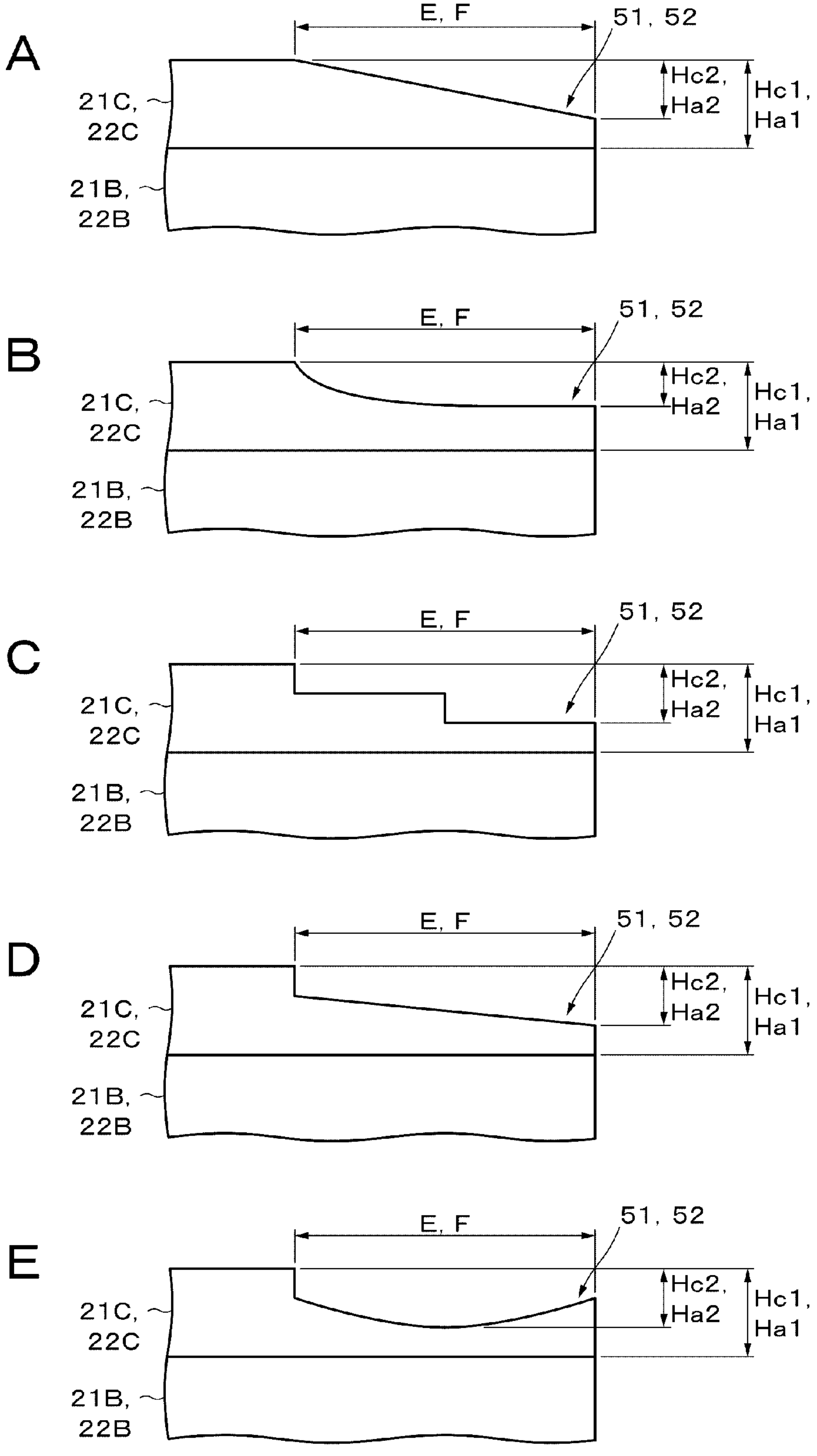
FIG. 9 includes views A to E for explaining a modification.

As shown in FIGS. 9A to 9D, for example, the shapes of the cut-out portions 51 and 52 may be such that the width of the cut-out portions 51 and 52 is wider on the winding start side, as shown in FIG. 9E, the shapes may be such that width of intermediate portions of the cut-out portions 51 and 52 is widest, or the cut-out portions 51 and 52 may have shapes other than these shapes.

In Examples and Comparative Examples, the number of the grooves 43 was set to 8, but other numbers may be used. The battery size is 21700, but may be 18650 or any other size.

The positive electrode current collector plate 24 and the negative electrode current collector plate 25 include the plate-shaped portions 31 and 33 having a fan shape, but may have other shapes.

Figure 10:
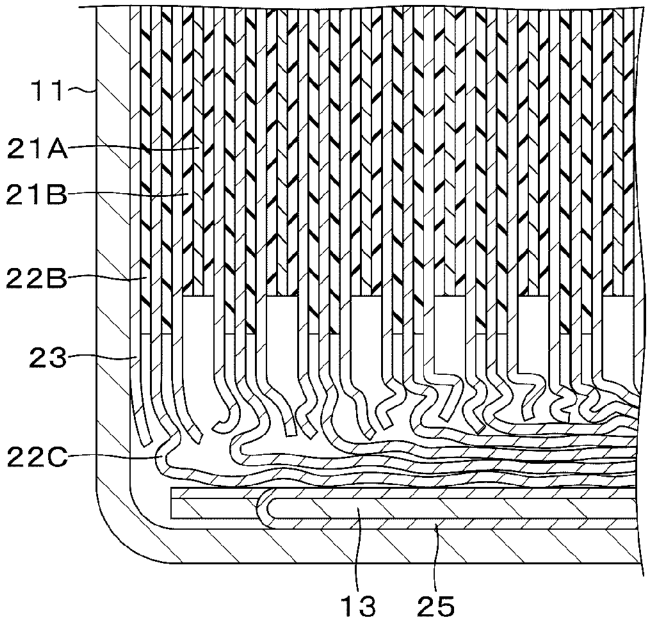
FIG. 10 includes views A and B, where A is an enlarged sectional view of a battery in a case where an insulating plate is provided on a negative electrode side, and where B is an enlarged sectional view of the battery in a case where the insulating plate is not provided on the negative electrode side.
Figure 10:
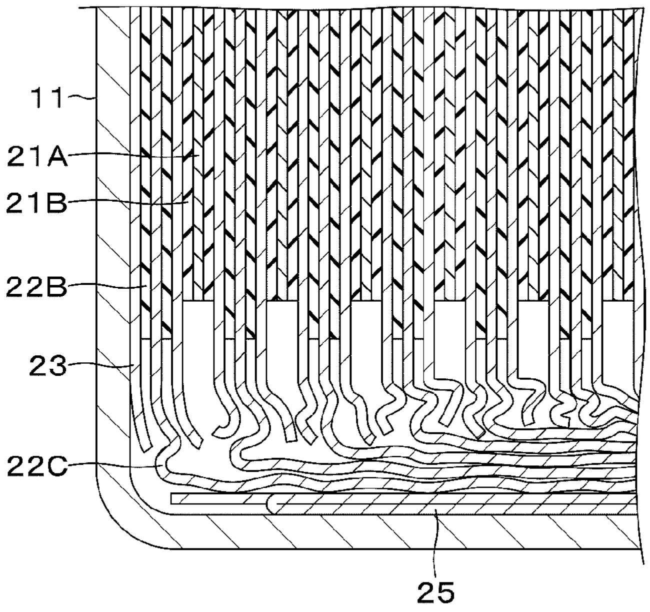

In Examples and Comparative Examples, as shown in FIG. 10A, the insulating plates 12 and 13 are arranged so as

TABLE 2

Figure 11:
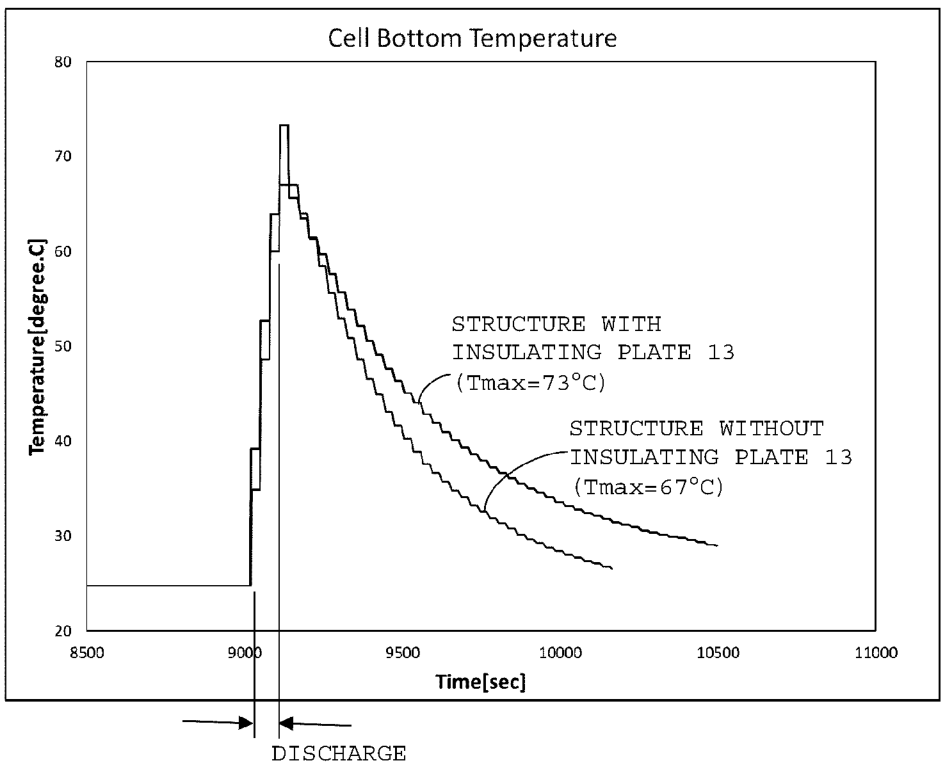
FIG. 11 is a graph showing a temperature change of the battery during a high current load test.

| | Position of end of cut-out portion of positive electrode | Position of end of cut-out portion of negative electrode | Hc2/Hc1 × 100 | Ha2/Ha1 × 100 | Presence or absence of active material non-covered portion at both ends in longitudinal direction of negative electrode | Open circuit voltage failure rate (%) |
|---|---|---|---|---|---|---|
| Example 11 | Active material non-covered portion of positive electrode | Active material non-covered portion of negative electrode | 15 | 15 | Absence | 3 |
| Example 12 | Active material non-covered portion of positive electrode | Active material non-covered portion of negative electrode | 20 | 20 | Absence | 1 |
| Example 13 | Active material non-covered portion of positive electrode | Active material non-covered portion of negative electrode | 30 | 30 | Absence | 1 |
| Example 14 | Active material non-covered portion of positive electrode | Active material non-covered portion of negative electrode | 90 | 90 | Absence | 1 |
| Example 15 | Active material non-covered portion of positive electrode | Active material non-covered portion of negative electrode | 95 | 95 | Absence | 2 |
| Comparative Example 11 | — | — | 0 | 0 | Absence | 6 |
| Comparative Example 12 | Active material covered portion of positive electrode | Active material covered portion of negative electrode | 100 | 100 | Absence | 7 |
| Comparative Example 13 | Active material covered portion of positive electrode | Active material covered portion of negative electrode | 110 | 110 | Absence | 7 |

to sandwich the electrode winding body 20 therebetween; however, as shown in FIG. 10B, a structure in which the insulating plate 13 is omitted can be adopted. In the structure in which the insulating plate 13 is omitted, heat generated from the electrode winding body at the time of discharging the battery is easily transferred to a bottom plate of the battery can 11 via the current collector plate 25. As a result, heat dissipation of the battery is improved. That is, there is an effect of lowering a battery surface temperature during discharge. As shown in FIG. 11, in a battery having a size of 18650 (diameter: 18 mm, height: 65 mm), the effect of lowering a maximum battery temperature at the time of a high load discharge test by 6° C. was confirmed. A device that performs large current discharge has a function of stopping the discharge at, for example, 75° C. in order to protect the battery. The fact that the battery temperature at the time of discharge can be lowered means that a use time of the device that performs large current discharge can be made longer, and deterioration of battery performance can be suppressed.

The high load discharge test is a test in which constant voltage-constant current charge of 4.2 V and 5 A is performed in an environment of room temperature of 23±2° C. for 2.5 hours, then the battery is left to stand until the temperature of the battery reaches 27° C. or less, then the battery is discharged at a current of 50 A, and the battery is left to stand until the battery surface temperature reaches 30° C. or less. At that time, a surface temperature (position at a height of 32.5 mm from the can bottom) of a side surface of the battery having a battery size of 18650 (diameter: 18 mm, height: 65 mm) was measured.

The present application can also be applied to other batteries other than the lithium ion battery and batteries having a shape other than a cylindrical shape (for example, a laminate-type battery, a square-type battery, a coin-type battery, and a button-type battery). In this case, the shape of the "end surface of the electrode winding body" may be not only a cylindrical shape but also an elliptical shape, a flat shape, or the like.

Figure 12:
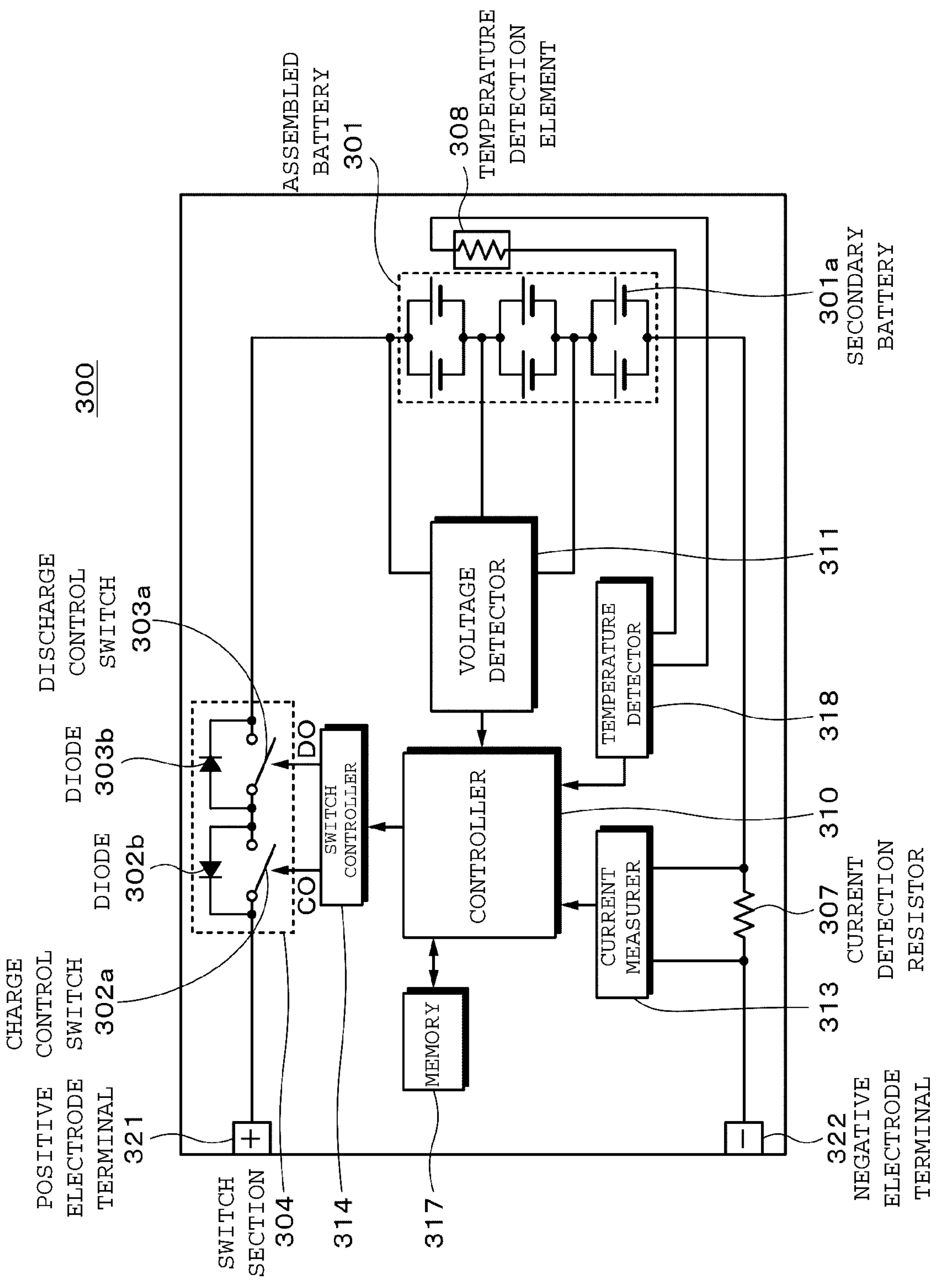
FIG. 12 is a connection diagram used for describing a battery pack as an application example of the present application.

FIG. 12 is a block diagram showing a circuit configuration example in a case where the battery 1 is applied to a battery pack 300 according to an embodiment. The battery pack 300 includes an assembled battery 301, a switch section 304 including a charge control switch 302*a* and a discharge control switch 303*a*, a current detection resistor 307, a temperature detection element 308, and a controller 310. The controller 310 can control each device, further perform charge and discharge control at the time of abnormal heat generation, and calculate and correct a remaining capacity of the battery pack 300. A positive electrode terminal 321 and a negative electrode terminal 322 of the battery pack 300 are connected to a charger or an electronic device, and are charged and discharged.

The assembled battery 301 is formed by connecting a plurality of secondary batteries 301*a* to each other in series and/or in parallel. FIG. 12 shows, as an example, a case where the six secondary batteries 301*a* are connected to each other in 2 parallel 3 series (2P3S).

The temperature detector 318 is connected to a temperature detection element 308 (for example, a thermistor), measures the temperature of the assembled battery 301 or the battery pack 300, and supplies the measured temperature to the controller 310. A voltage detector 311 measures the voltage of the assembled battery 301 and the respective secondary batteries 301*a* configuring the assembled battery and performs A/D conversion of this measured voltage to supply the resulting voltage to the controller 310. A current measurer 313 measures the current by using the current detection resistor 307 and supplies this measured current to the controller 310.

A switch controller 314 controls the charge control switch 302*a* and the discharge control switch 303*a* of the switch section 304 based on the voltage and the current input from the voltage detector 311 and the current measurer 313. The switch controller 314 prevents overcharge and overdischarge by sending an OFF control signal to the switch section 304 when the voltage of the secondary battery 301*a* has become equal to or higher than an overcharge detection voltage (for example, 4.20 V±0.05 V) or equal to or lower than an overdischarge detection voltage (2.4 V±0.1 V).

After the charge control switch 302*a* or the discharge control switch 303*a* is turned off, charging or discharging can be performed only through a diode 302*b* or a diode 303*b*. As these charge/discharge switches, a semiconductor switch such as a MOSFET can be used. In FIG. 12, the switch section 304 is provided on a plus (+) side, but may be provided on a minus (−) side.

The memory 317 includes a RAM and a ROM, and stores and rewrites a value of the battery characteristics calculated by the controller 310, a full charge capacity, the remaining capacity, and the like.

The battery 1 is mounted on a device such as an electronic device, an electric transportation device, or a power storage device, and can be used for supplying electric power according to an embodiment.

Examples of the electronic device include notebook personal computers, smartphones, tablet terminals, PDAs (personal digital assistants), mobile phones, wearable terminals, digital still cameras, electronic books, music players, game machines, hearing aids, power tools, televisions, lighting devices, toys, medical devices, and robots. In addition, electric transportation devices, power storage devices, power tools, and electric unmanned aerial vehicles to be described later can also be included in the electronic device in a broad sense.

Examples of the electric transportation device include electric vehicles (including hybrid vehicles), electric motorcycles, electric assisted bicycles, electric buses, electric carts, automatic guided vehicles (AGV), and railway vehicles. In addition, electric passenger aircrafts and electric unmanned aircrafts for transportation are also included. The secondary battery according to the present application is used not only as these driving power supplies but also as an auxiliary power supply, a power supply for recovering a regenerated energy, and other power supplies.

Examples of the power storage device include power storage modules for commercial use or household use, and power supplies for electric power storage use for a building such as a house, a building, or an office, or for a power-generating facility.

Figure 13:
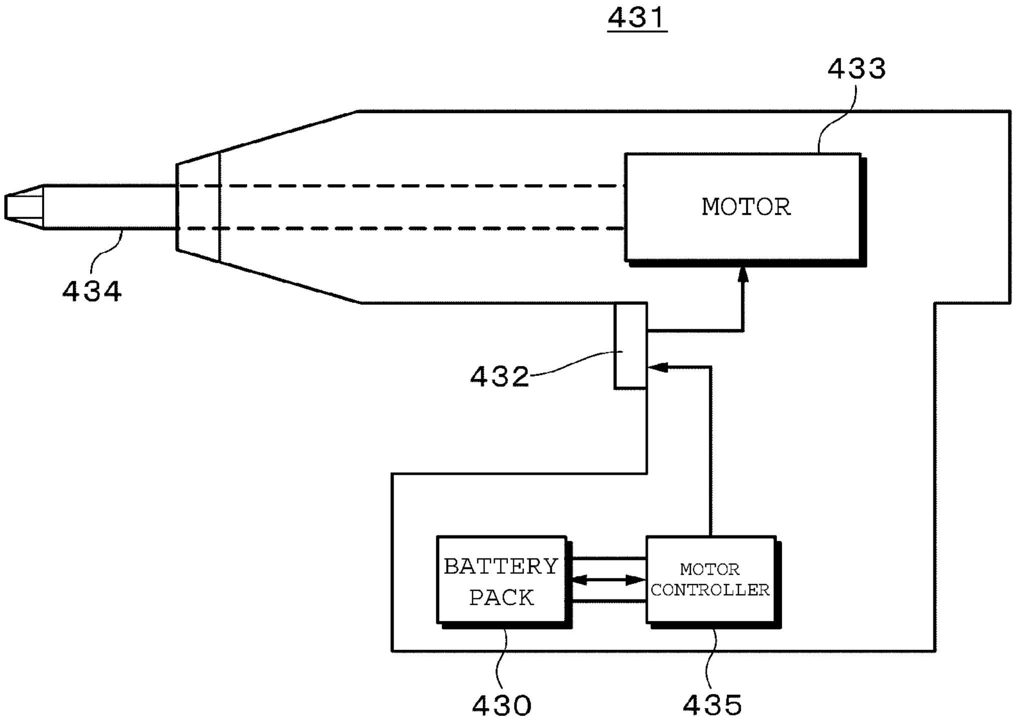
FIG. 13 is a connection diagram used for describing a power tool as an application example of the present application.

An example of an electric driver as a power tool to which the present application can be applied will be schematically described with reference to FIG. 13 according to an embodiment. An electric driver 431 is provided with a motor 433 that transmits rotational power to a shaft 434 and a trigger switch 432 operated by a user. A battery pack 430 and a motor controller 435 according to the present application are housed in a lower housing of a handle of the electric driver 431. The battery pack 430 is built in the electric driver 431 or is detachable. The battery 1 can be applied to a battery constituting the battery pack 430 according to an embodiment.

Each of the battery pack 430 and the motor controller 435 may be provided with a microcomputer (not shown) so that charge/discharge information of the battery pack 430 can be communicated with each other. The motor controller 435 can control operation of the motor 433 and cut off power supply to the motor 433 at the time of abnormality such as overdischarge.

Figure 14:
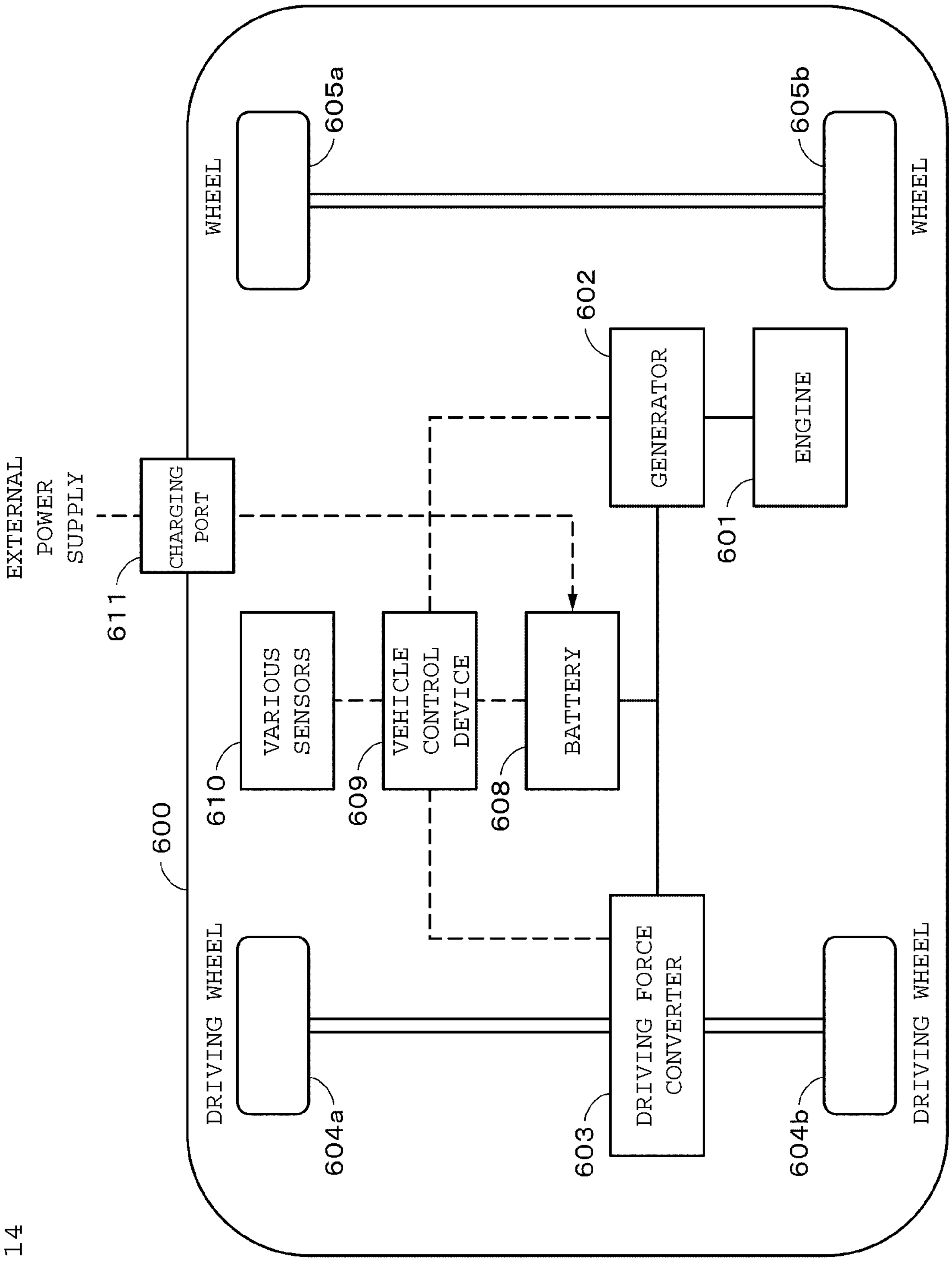
FIG. 14 is a connection diagram used for describing an electric vehicle as an application example of the present application.

As an example in which the present application is applied to an electric vehicle power storage system, FIG. 14 schematically shows a configuration example of a hybrid vehicle (HV) employing a series hybrid system according to an embodiment. The series hybrid system is a car travelling with an electric power driving force converter using electric power generated by a generator powered by an engine or electric power obtained by temporarily storing the generated electric power in a battery.

An engine 601, a generator 602, an electric power driving force converter 603 (DC motor or AC motor, hereinafter, it is simply referred to as the "motor 603"), a driving wheel 604*a*, a driving wheel 604*b*, a wheel 605*a*, a wheel 605*b*, a battery 608, a vehicle control device 609, various sensors 610, and a charging port 611 are mounted in a hybrid vehicle 600 as described above. As the battery 608, the battery pack 300 or a power storage module on which a plurality of the batteries 1 are mounted can be applied according to an embodiment.

The motor 603 is operated by the electric power of the battery 608, and a rotating force of the motor 603 is transmitted to the driving wheels 604*a* and 604*b*. The electric power generated by the generator 602 can be stored in the battery 608 by the rotating force generated by the engine 601. The various sensors 610 control an engine speed through the vehicle control device 609, or control an opening degree of a throttle valve (not shown).

When the hybrid vehicle 600 is decelerated by a brake mechanism (not shown), a resistance force during the deceleration is added as a rotating force to the motor 603, and regenerative electric power generated due to this rotating force is stored in the battery 608. The battery 608 can be charged by being connected to an external power supply via the charging port 611 of the hybrid vehicle 600. Such an HV vehicle is referred to as a plug-in hybrid vehicle (PHV or PHEV).

The secondary battery according to the present application can also be applied to a downsized primary battery and used as a power supply of a tire pressure monitoring system (TPMS) built in wheels 604 and 605.

Although a series hybrid vehicle has been described above as an example, the present application is also applicable to a parallel system using an engine and a motor together or a hybrid vehicle in which a series system and a parallel system are combined. In addition, the present application is also applicable to an electric vehicle (EV or BEV) and a fuel cell vehicle (FCV) that travel only by a drive motor not using an engine.

DESCRIPTION OF REFERENCE SYMBOLS

1: Lithium ion battery
12: Insulating plate
21: Positive electrode
21A: Positive electrode foil
21B: Positive electrode active material covered portion
21C: Active material non-covered portion of positive electrode
22: Negative electrode
22A: Negative electrode foil
22B: Negative electrode active material covered portion
22C: Active material non-covered portion of negative electrode
23: Separator
24: Positive electrode current collector plate
25: Negative electrode current collector plate
26: Through hole
27, 28: Outer edge portion
41, 42: End surface
43: Groove
51: Cut-out portion of positive electrode
52: Cut-out portion of negative electrode
53: End of cut-out portion of positive electrode
54: End of cut-out portion of negative electrode It should be understood that various modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:

an electrode winding body having a structure in which a strip-shaped positive electrode and a strip-shaped negative electrode are stacked with a separator interposed therebetween and wound, a positive electrode collector plate, and a negative electrode collector plate are housed in a battery can, the positive electrode having a positive electrode active material covered portion covered with a positive electrode active material and a positive electrode active material non-covered portion on a strip-shaped positive electrode foil, the negative electrode having a negative electrode active material covered portion covered with a negative electrode active material and a negative electrode active material non-covered portion on a strip-shaped negative electrode foil, the positive electrode active material non-covered portion being joined to a positive electrode current collector plate at one end portion of the electrode winding body, the negative electrode active material non-covered portion being joined to the negative electrode current collector plate at the other end portion of the electrode winding body, the electrode winding body having a flat surface formed by bending any one or both of the positive electrode active material non-covered portion and the negative electrode active material non-covered portion toward a central axis of the wound structure and overlapping the positive electrode active material non-covered portion and the negative electrode active material non-covered portion, and a groove formed in the flat surface, the positive electrode having a positive electrode cut-out portion at one end in a transverse direction of the positive electrode on a winding start side of the electrode winding body, the negative electrode having a negative electrode cut-out portion at one end in the transverse direction of the negative electrode on the winding start side of the electrode winding body, an end of the positive electrode cut-out portion being present at the positive electrode active material non-covered portion, and an end of the negative electrode cut-out portion being present at the negative electrode active material non-covered portion, the positive electrode cut-out portion and the negative electrode cut-out portion are disposed near a through hole after the winding, and the flat surface includes at least a portion with multiple layers of the positive electrode active material non-covered portion or the negative electrode active material non-covered portion, respectively, in contact with each other.

2. The secondary battery according to claim 1, wherein when a width of the positive electrode active material non-covered portion located at one end in the transverse direction of the positive electrode is Hc1, a width of the positive electrode cut-out portion is Hc2, a width of the negative electrode active material non-covered portion located at one end in the transverse direction of the negative electrode is Ha1, and a width of the negative electrode cut-out portion is Ha2, $15 \leq (Hc2/Hc1) \times 100 \leq 95$, and $15 \leq (Ha2/Ha1) \times 100 \leq 95$ are satisfied.

3. The secondary battery according to claim 1, wherein when a width of the positive electrode active material non-covered portion located at one end in the transverse direction of the positive electrode is Hc1, a width of the positive electrode cut-out portion is Hc2, a width of the negative electrode active material non-covered portion located at one end in the transverse direction of the negative electrode is Ha1, and a width of the negative electrode cut-out portion is Ha2, $20 \leq (Hc2/Hc1) \times 100 \leq 90$, and $20 \leq (Ha2/Ha1) \times 100 \leq 90$ are satisfied.

4. The secondary battery according to claim 1, wherein each of a length of the positive electrode cut-out portion along a longitudinal direction of the positive electrode and a length of the negative electrode cut-out portion along the longitudinal direction of the negative electrode corresponds to once or more and five times or less an inner peripheral portion of the electrode winding body.

5. The secondary battery according to claim 1, wherein the positive electrode foil has a thickness of 5 μm or more and 20 μm or less, and the negative electrode foil has a thickness of 5 μm or more and 20 μm or less.

6. An electronic device comprising the secondary battery according to claim 1.

7. A power tool comprising the secondary battery according to claim 1.

8. The secondary battery according to claim 1, wherein in the positive electrode cut-out portion, the positive electrode active material non-covered portion includes a first part and a second part in order of positions closer to an edge, in a longitudinal direction, of the positive electrode that is on the winding start side of the electrode winding body, the first part having a first width, the second part having a second width that is smaller than the first width.

9. The secondary battery according to claim 8, wherein in the positive electrode cut-out portion, the positive electrode active material non-covered portion further includes a third part on an opposite side of the second part to the edge, in the longitudinal direction, of the positive electrode that is on the winding start side of the electrode winding body, the third part having a third width that is greater than the second width.

10. The secondary battery according to claim 1, wherein in the negative electrode cut-out portion, the negative electrode active material non-covered portion includes a fourth part and a fifth part in order of positions closer to an edge, in a longitudinal direction, of the negative electrode that is on the winding start side of the electrode winding body, the fourth part having a fourth width, the fifth part having a fifth width that is smaller than the fourth width.

11. The secondary battery according to claim 10, wherein in the negative electrode cut-out portion, the negative electrode active material non-covered portion further includes a sixth part on an opposite side of the fifth part to the edge, in the longitudinal direction, of the negative electrode that is on the winding start side of the electrode winding body, the sixth part having a sixth width that is greater than the fifth width.

* * * * *